(12) United States Patent
Shibata

(10) Patent No.: US 6,847,759 B2
(45) Date of Patent: Jan. 25, 2005

(54) WAVELENGTH DISPERSION COMPENSATING FILTER

(75) Inventor: Kohei Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 10/375,124

(22) Filed: Feb. 28, 2003

(65) Prior Publication Data

US 2003/0202743 A1 Oct. 30, 2003

(30) Foreign Application Priority Data

Apr. 24, 2002 (JP) ......................................... 2002-121659

(51) Int. Cl.[7] ................................................ G02B 6/26
(52) U.S. Cl. ............................. 385/27; 385/24; 385/32
(58) Field of Search ............................. 385/14, 24, 27, 385/50, 30–32, 39–45

(56) References Cited

U.S. PATENT DOCUMENTS

| 4,592,043 | A | | 5/1986 | Williams | |
|---|---|---|---|---|---|
| 6,289,151 | B1 | | 9/2001 | Kazarinov et al. | |
| 6,389,203 | B1 | * | 5/2002 | Jordan et al. | ............... 385/50 |
| 6,766,083 | B2 | * | 7/2004 | Bona et al. | ................... 385/40 |
| 2003/0086638 | A1 | * | 5/2003 | Frolov et al. | ................. 385/17 |
| 2003/0235367 | A1 | * | 12/2003 | Yamazaki | .................... 385/39 |

FOREIGN PATENT DOCUMENTS

| JP | 57-66403 | 4/1982 |
|---|---|---|
| JP | 57-089702 | 6/1982 |
| JP | 1-306801 | 12/1989 |
| JP | 6-276160 | 9/1994 |
| JP | 2000-151513 | 5/2000 |
| JP | 3112193 | 9/2000 |
| JP | 2001-305497 | 10/2001 |
| JP | 2001-318249 | 11/2001 |

* cited by examiner

*Primary Examiner*—Ellen E. Kim
*Assistant Examiner*—Kevin S. Wood
(74) *Attorney, Agent, or Firm*—Staas & Halsey LLP

(57) ABSTRACT

A 2-input, 2-output optical circuit is constructed by serially connecting two or more Mach-Zehnder interferometers possessing a structure in which two waveguides are embraced by two couplers. One output and one input of the two 2-input, 2-output optical circuit are connected by an optical propagation path to thereby construct a loop circuit. The waveguides of the Mach-Zehnder interferometers as well as the loop circuit are each provided with an optical path-length adjustment portion, thereby constructing a wavelength dispersion compensating filter.

14 Claims, 11 Drawing Sheets

WAVELENGTH DISPERSION COMPENSATING FILTER

BACKGROUND OF THE INVENTION

This invention relates to a wavelength dispersion compensating filter and, more particularly, to a wavelength dispersion compensating filter which compensates for wavelength dispersion produced at the time of a signal pulse transmission in optical communication using wavelength division multiplexing (referred to as "WDM" below).

In the transmission of optical signal pulses using optical fiber, transmission rate in the fiber differs depending upon the wavelength of light. As a consequence, the waveform of the signal pulses becomes less steep as transmission distance increases. This phenomenon, referred to as-wavelength dispersion, degrades the reception level to a great degree. For example, with an SMF (Single-Mode Fiber), wavelength dispersion on the order of 15 to 16 ps/nm/km is produced in the vicinity of a wavelength of 1.55 μm often used in communication of optical pulses. Wavelength dispersion compensation is for subjecting wavelength dispersion, which has been produced in an optical fiber, to an equivalent amount of wavelength dispersion in reverse.

What is used most often in dispersion compensation at the present time is dispersion compensating fiber (referred to as "DCF" below). This fiber produces reverse dispersion (structural dispersion), by a special refractive index distribution, with respect to material dispersion possessed by the fiber material, and is designed so as to exhibit dispersion which, in total, is the reverse of that of ordinary SMF. It is possible to achieve dispersion compensation that is five to ten times that obtained with SMF of an equivalent length. Such DCF is connected to SMF in a repeater office to make the dispersion zero overall.

Dispersion compensation using DCF involves two major problems in terms of transmission system architecture. One is that the distance between repeaters where DCF is inserted differs from system to system. This means that it is necessary to provide a dispersion compensating module having a specifically designed DCF length for each and every repeater node. The second problem arises from the fact that the wavelength dependence of the dispersion characteristic, which is referred to as "dispersion slope", is not the same for DCF and SMF. Wavelength dispersion that could not be subjected to dispersion compensation completely (such dispersion shall be referred to as "residual dispersion" below) occurs at both ends of a wavelength band used in WDM transmission, e.g., a wavelength band referred to as the "C band" in which the wavelength of light is in the vicinity of 1530 to 1560 nm. This residual dispersion accumulates as transmission distance increases and, as a result, it is necessary to compensate for this residual dispersion channel by channel. For example, in the example shown in FIG. 16, if a signal is transmitted through 10 km of SMF and dispersion compensation is applied to the center wavelength (1545 nm) using DCF having a dispersion slope of 0.2 ps/km/nm$^2$, residual dispersions of about 20 ps/nm and about −30 ps/nm occur in $1^{st}$ and $40^{th}$ channels, respectively, having a channel wavelength spacing of 100 GHz in the C band. As a consequence of these two problems, dispersion compensating modules of a very large number of types must be prepared in order to construct a single system, and designing the system becomes very complicated. In order to solve these problems, there is compelling need for implementation of a wavelength dispersion compensator in which the amount of compensation is capable of being varied over a range of negative to positive values.

One example that can be mentioned from the standpoint of good productivity is a variable dispersion compensator that employs PLC (Planar Lightwave Circuit) technology.

Filters used in wavelength dispersion compensation are classified broadly into two types, namely IIR (Infinite Impulse Response) and FIR (Finite Impulse Response). Both achieve variable compensation by changing the optical path length of the portion of a waveguide that decides the amount of compensation, using an EO (electro-optic) effect that produces a change in dielectric constant within the waveguide, i.e., a change in effective refractive index), by applying an electric field from outside the waveguide, or a TO (thermo-optic) effect in which the refractive index of the waveguide is changed by temperature.

The FIR-type filter controls frequency response by feedforward. A typical arrangement that can be mentioned is composed of serially connected multiple MZIs (Mach-Zehnder interferometers) proposed by Takiguchi et al. (see Variable Group-Delay Dispersion Equalizer, IEEE J. of Quant. Elect.), illustrated in FIG. 17. As shown in FIG. 17, MZIs 1 each have a structure in which two waveguides 1*a*, 1*a* are embraced by two couplers 1*b*, 1*b*. A heater 1*c* for adjustment of the optical path length is provided on the upper side of the central portion of the waveguide on the outer side of each MZI, and electrodes 1*d* for applying voltage are formed on both sides of the headers 1*c*. The FIR-type wavelength dispersion compensating filter is obtained by building up an SiO$_2$ clad 3 on an SiO$_2$ substrate 2 and building up an SiO$_2$ core layer 4 on the clad 3. Next, by performing patterning, the two waveguides 1*a*, 1*a* are formed by the SiO$_2$ core 4, as depicted in FIG. 17, and the couplers 1*b* are formed at suitable locations. Thereafter, a further clad layer is built up, though this is not shown, the heater 1*c* is formed on this clad layer and then the electrode 1*d* is formed on this heater to complete the device.

This FIR-type wavelength dispersion compensating filter has a highly stable frequency characteristic. However, a large number of circuit elements (the number of MZI stages) is needed to produce a steep frequency response. Since this necessitates a large chip area, this filter is not very desirable in terms of productivity.

The IIR-type filter, which is referred to also as a "rational filter", has one or more feedback loops between the filter input and output. With the IIR-type filter, the frequency (wavelength) characteristic has a peak ascribable to the feedback loops, and it is possible to obtain a steep frequency response with a small number of circuit elements (couplers, etc.) by suitably engineering the position of the peak, as is known in electrical circuit theory. The most simplest of the IIR-type filters is a ring resonator. Though a ring resonator exhibits a very steep frequency response, the FSR (Free Spectral Range, which corresponds to the spacing of resonance peaks) thereof is proportional to 1/(ring length). As a consequence, accuracy of the length of waveguides having little difference in refractive index are limited by the minimum bending radius and there are cases where the desired FSR cannot be obtained.

An all-pass optical filter (U.S. Pat. No. 6,289,151 B1, referred to as a Madsen-type or prior-art filter below) according to R. F. Kazarinov and C. K. Madsen, et al. has been proposed as a filter to solve this problem. As shown in FIG. 18, this filter has a structure in which one input and one output of an MZI 5 are connected by a loop. The MZI 5 has a structure in which waveguides 5*a*, 5*b* are embraced by two couplers 5c, 5d, heaters 5e, 5f for adjusting amount of dispersion compensation are provided on the upper side of the central portion of the waveguides 5a, 5b, and electrodes (not shown) for applying voltage are formed on both sides of each of the heaters. A heater 6b for adjusting center wavelength is provided on the upper side of the central portion of a waveguide 6a of a loop portion 6 that forms the loop. Reference numeral 7 denotes a silicon (Si) substrate and 8 an $SiO_2$ clad. This all-pass optical filter is formed in a manner similar to the filter shown in FIG. 17.

In accordance with the all-pass optical filter shown in FIG. 18, the amount of change in phase at the design wavelength and the FSR can be designed independently using two parameters, namely ①̂ loop length and ②̂ the difference in optical path length between the two waveguides 5a, 5b in the MZI. As a result, it is possible to realize a compact dispersion compensator that uses an IIR filter at a design wavelength.

As mentioned above, dispersion compensation requires compensation even of residual dispersion after compensation by DCF is applied. Accordingly, the ability to perform positive compensation and negative compensation, inclusive of an amount of dispersion compensation of zero, is sought. The prior-art Madsen-type dispersion compensating filter cannot achieve an amount of dispersion compensation of zero when manufacturability is taken into account, and a problem which arises is that many products in which the range of dispersion compensation is limited are produced.

The problems of the Madsen-type dispersion compensating filter will now be described in detail through the following procedure: ①̂ The transfer function of the Madsen-type dispersion compensating filter will be given, the conditions that give dispersion compensation quantity=0 will be indicated and the limitation imposed upon the design parameters by the conditions for dispersion compensation quantity=0 will be indicated. ②̂ The fact that many dispersion compensators which are limited in terms of compensation range occur will be discussed, in which it will be pointed out that it is difficult to reconcile both the conditions that give dispersion compensation quantity=0 and design parameters exhibiting variations in manufacture when the filter is actually manufactured, this being ascribable to the range of fluctuation when manufacturing variations in each of the design parameters are taken into account.

Design parameters of Madsen-type dispersion compensating filter

The design parameters and operation (see Table 1) of a prior-art Madsen-type dispersion compensating filter (see FIG. 18) will be described in simple terms. As shown in Table 1 below, the design parameters are loop optical path length $\Delta L_r n(\lambda)$, MZI optical path length difference $\Delta L_m n(\lambda)$ and MZI coupler splitting ratios $\theta_1$, $\theta_2$.

TABLE 1

RELATIONSHIP BETWEEN PARAMETERS OF MADSEN-TYPE FILTERS AND TRANSMISSION CHARACTERISTICS

| DESIGN PARAMETER | RELATED CHARACTERISTICS | DESCRIPTION OF TENDENCY |
|---|---|---|
| ① OPTICAL PATH LENGTH OF LOOP $\Delta L_r n(\lambda)$ | FSR; CENTER FREQUENCY | FSR 0.8 nm SPACING → ABOUT 2-mm SPACING; CONTROL OF CENTER WAVELENGTH WITH LINEAR CHANGE OF $\lambda$ ORDER |
| ② MZI OPTICAL PATH LENGTH DIFFERENCE $\Delta L_m n(\lambda)$ | DISPERSION COMPENSATION QUANTITY; BANDWIDTH (TRADEOFF) | PHASE COMPENSATION QUANTITY MAX FOR LENGTH OF SEVERAL-MICRON ORDER; COMPENSATION QUANTITY IS REDUCED IN ACCORDANCE WITH DEVIATION FROM THIS LENGTH |
| ③ MZI COUPLER SPLITTING RATIOS $\theta_1$, $\theta_2$ | STRENGTH OF PHASE CHANGE; SETTING OF DISPERSION COMPENSATION QUANTITY = 0 POINT | VARIATION IN PHASE IS REDUCED IF COUPLING IS WEAK |

①̂ The FSR is set by the loop built-in optical path length (loop length prior to adjustment) $\Delta L_r n(\lambda)$, where $\Delta L_r$ represents the loop optical path length and $n(\lambda)$ the effective refractive index of the waveguide. The heater 6b is formed in the loop 6 and adjustment of the optical path length on the order of $\lambda$ (1.55 μm) is performed by the TO effect, thereby controlling the center wavelength position within the FSR.

②̂ Path length difference $\Delta L_m n(\lambda)$ between the waveguides 5a and 5b of the MZI portion is related to the amount of dispersion compensation, where $\Delta L_m$ represents the path length difference and $n(\lambda)$ the effective refractive index of the waveguide. The amount of dispersion compensation at non-heating of the heaters 5e, 5f provided on the branches 5a, 5b of the MZI portion is decided by the built-in path length difference (path length difference prior to adjustment) $\Delta L_m n(\lambda)$, and the amount of dispersion compensation is controlled by controlling the heating of the heaters 5e, 5f. In a case where the amount of compensation applied is minimum when the heaters are not producing heat, the built-in path length difference is assumed to be zero.

③̂ (The coupling strengths (rotation angles $\theta_1$, $\theta_2$) of the two couplers 5c and 5d exhibit a fixed relationship in order to implement dispersion compensation quantity=0. In a case where the dispersion compensation quantity is adjusted by changing $\Delta L_m n(\lambda)$ by the TO effect, etc., it will suffice to select the rotation angles $\theta_1$, $\theta_2$ so as to satisfy Equation (11) (e.g., rotation angle rotation angles $\theta_1 = \theta_2 = \pi/4$, etc.) described below.

Transfer function of Madsen-type dispersion compensating filter

The transfer function of a Madsen-type dispersion compensating filter is given as follows:

First, a transfer matrix $m(\lambda)$ of an MZI (4-terminal circuit) is expressed as follows using the path difference $\Delta L_m$, coupler rotation angles (couplings) $\theta_1$, $\theta_2$, effective refractive index $n(\lambda)$ of the waveguide and input wavelength $\lambda$:

$$m = \begin{bmatrix} m_{11} & m_{12} \\ m_{21} & m_{22} \end{bmatrix} \text{ where det } m = 1 \quad (1)$$

$$m = \begin{bmatrix} \cos\theta_2 & -\sin\theta_2 \\ \sin\theta_2 & +\cos\theta_2 \end{bmatrix} \begin{bmatrix} \exp[-j\pi\Delta L_m n(\lambda)/\lambda] & 0 \\ 0 & \exp[j\pi\Delta L_m n(\lambda)/\lambda] \end{bmatrix} \begin{bmatrix} \cos\theta_1 & -\sin\theta_1 \\ \sin\theta_1 & +\cos\theta_1 \end{bmatrix}$$

Further, a phase shift $h(\lambda)$ produced by the loop-back portion 6 is expressed as follows using the optical path length $\Delta Lr$:

$$h(\lambda) = \exp[-j2\pi\Delta L_r n(\lambda)/\lambda] \quad (2)$$

A transfer function $H(\lambda)$ of the Madsen-type dispersion compensating filter is expressed by the following equation using $m(\lambda)$ and $h(\lambda)$:

$$H(\lambda) = \frac{h(\lambda) - m_{22}}{h(\lambda)m_{11} - 1} = \frac{h(\lambda) - m_{11}^*}{h(\lambda)m_{11} - 1} \quad (3)$$

where $m_{11}^*$ represents the complex conjugate of $m_{11}$. Group delay $D(\lambda)$ is obtained by differentiating the phase part of the transfer function of Equation (3) by $\omega(=2\pi c/\lambda$, where c represents the velocity of light), and wavelength-dispersion $DS(\lambda)$ is obtained by differentiating the group delay $D(\lambda)$ by wavelength $\lambda$. That is, if we let the phase part of the transfer function be represented by $argH(\lambda)$, then we have $$D(\lambda) = -(\lambda^2/2\pi c)(d/d\lambda)[argH(\lambda)] \quad (4)$$

$$DS(\lambda) = (d/d\lambda)D(\lambda) \quad (5)$$

Here $argH(\lambda)$ is expressed as follows:

$$argH(\lambda) = \arctan\left\{\frac{\sin[-2\pi\Delta L_r n(\lambda)/\lambda] - \beta}{\cos[-2\pi\Delta L_r n(\lambda)/\lambda] - \alpha}\right\} - \quad (6)$$

$$\arctan\left\{\frac{\alpha\sin[-2\pi\Delta L_r n(\lambda)/\lambda] - \beta\cos[-2\pi\Delta L_r n(\lambda)/\lambda]}{\alpha\cos[-2\pi\Delta L_r n(\lambda)/\lambda] - \beta\sin[-2\pi\Delta L_r n(\lambda)/\lambda] - 1}\right\}$$

where the following holds:

$$\alpha = \cos[\pi\Delta L_m n(\lambda)/\lambda]\cos(\theta_1 + \theta_2) \quad (7)$$

$$\beta = \sin[\pi\Delta L_m n(\lambda)/\lambda]\cos(\theta_1 - \theta_2) \quad (8)$$

Conditions that give dispersion compensation quantity=0

Dispersion compensation quantity=0 means that $DS(\lambda)=0$ holds in Equation (5) and that $D(\lambda)$ in Equation (4) is a constant. This signifies that it is required that $argH(\lambda)$ be expressed by the following function:

$$argH(\lambda) = C_1/\lambda + C_2 \ (C_1, C_2 \text{ are constants}) \quad (9)$$

or $$argH(\lambda) = C_3 \ (C_3 \text{ is a constant}) \quad (10)$$

by the design parameters.

A condition that will satisfy Equation (9) is $(\alpha,\beta)=(0,0)$, in which we will have $$argH(\lambda) = -2\Delta L_r n(\lambda)/\lambda$$

Further, examples of parameters are the following Equations (11), (12):

$$\Delta L_m = 0 \text{ and } \theta_1 + \theta_2 = \pi(2k+1)/2 (k=0,1,2,\ldots) \quad (11)$$

$$n(\lambda) = C_4\lambda + C_5 \ (C_4, C_5 \text{ are constants}) \quad (12)$$

or the following equations (13), (14):

$$\theta_2 = \pi/2 \text{ and } \theta_1 = \theta_2 + \pi(2m-1)/2 (m=1,2,3,\ldots) \quad (13)$$

$$n(\lambda) = C_4\lambda + C_5 \ (C_4, C_5 \text{ are constants}, \Delta L_m \neq 0) \quad (14)$$

In case of a quartz-type waveguide, it is considered that Equations (13) and (14) are approximations that will hold true satisfactorily in the C band (in the vicinity of wavelengths 1530 to 1560 nm). This condition means that signal light passes through the loop one time only.

On the other hand, a condition that will satisfy Equation (10) is $(\alpha,\beta)=(\pm 1,0)$, and the following Equation (15) is an example of a parameter:

$$\Delta L_m = 0 \text{ and } \theta_1 + \theta_2 = m\pi (m=0,1,2,3\ldots) \quad (15)$$

This condition means that signal light is transmitted without entering the loop.

Thus, in the prior-art example, it will be understood that the relationships of Equations (11) to (15) are required for the two coupler splitting ratios (rotation angles $\theta_1$, $\theta_2$) in order to obtain dispersion compensation quantity=0.

Conditions that give dispersion compensation quantity=0, and manufacturing variations When manufacturability (the product of a variation in refractive index and a variation in core machining) is taken into account, it is required that a deviation of, e.g., ±10% from what is sought be allowed for the coupler splitting ratio. In other words, owing to a variation in manufacture, coupler splitting ratio deviates from the design value by a maximum of ±10%. If the coupler splitting ratio deviates from this design value by more than a predetermined percentage, it will no longer be possible to obtain dispersion compensation quantity=0 even if the MZI optical-path difference $\Delta L_m n(\lambda)$ and feedback-loop path length $\Delta L_r n(\lambda)$, which are factors adjustable by the TO effect, are varied. In other words, it is not possible to apply a range extending from dispersion compensation quantity=0 to a minimum compensation quantity (a minimum compensation quantity that corresponds to deviation from the design condition of the two coupler branches). As a result, the aforementioned problem arises, namely the occurrence of a large number of products that cannot be compensated completely for residual dispersion extending from positive to negative values.

FIG. 19 illustrates as an example of a group delay $D(\lambda)$ vs. wavelength ($\lambda$) characteristic, namely a wavelength dispersion compensation characteristic, for a case where the rotation angle $\theta_2$ of the second coupler has deviated from the design value ($\theta_1=\theta_2=\pi/4$) by 5%. The slope of this characteristic is the wavelength dispersion $DS(\lambda)$. This is the dispersion compensation quantity. In FIG. 19, the optical path length difference $\Delta L_m n(\lambda)$ (which is an adjustable parameter) between the MZI branches is varied from the positive state, namely a state in which the waveguide 5b on the outer side is long, to the negative state, namely a state in which the waveguide 5a on the inner side is long. However, it will be understood that even if the optical path length difference $\Delta L_m n(\lambda)$ is varied from 150 nm to −150 nm, a range in which dispersion compensation quantity=0 (zero slope) holds is not obtained anywhere in the necessary band (10 Gbps: 0.16 nm).

Further, the center wavelength (peak wavelength) also varies owing to the effect of the deviation in the rotation angle $\theta_2$ (there is no change in the case of a value that is in accordance with the design value), as indicated by FIG. 19. In order to compensate for this change, it is necessary to adjust the optical path length $\theta L_r n(\lambda)$ of the loop portion.

SUMMARY OF THE INVENTION

Accordingly, an object of the present invention is to so arrange that even if the coupler splitting ratio (coupler rotation angle) of the MZI portion deviates from the design value from one device to the next owing to manufacturing variations or the like, dispersion compensation quantity=0 will be obtained by adjusting the value of optical path length difference $\Delta L_m n(\lambda)$ using the TO effect or EO effect.

Another object of the present invention is to make positive compensation and negative compensation, inclusive of dispersion compensation quantity=0, possible, thereby making it possible to compensate for residual dispersion after dispersion compensation.

According to the present invention, the foregoing objects are obtained by providing a wavelength dispersion compensating filter having a 2-input, 2-output optical circuit, in which the 2-input, 2-output optical circuit is constructed by serially connecting two or more Mach-Zehnder interferometers possessing a structure in which two waveguides are embraced by two couplers, one output and one input of the two 2-input, 2-output optical circuit are connected by an optical propagation path to thereby construct a loop circuit, and the waveguides of the Mach-Zehnder interferometers as well as the loop circuit are each provided with a optical path-length adjustment portion. The optical path-length adjustment portion adjusts optical path length by the electro-optic effect or thermo-optic effect.

If a wavelength dispersion compensating filter is thus constructed, dispersion compensation quantity=0 can be obtained by adjusting the value of optical path length difference $\Delta L_m n(\lambda)$ using the TO effect, etc., even if the coupler splitting ratio (coupler rotation angle) of the MZI portion deviates from the design value from one device to the next owing to manufacturing variations or the like. As a result, wavelength dispersion compensation can be performed to deal even with residual deviation irrespective of individual difference, device manufacturability (yield) can be increased by a wide margin and the cost of the dispersion compensating device can be reduced. In addition, the size of the dispersion compensating filter can be reduced by serially connecting two Mach-Zehnder interferometers.

A coupler having little wavelength dependence is used as the couplers that construct the Mach-Zehnder interferometers. If this arrangement is adopted, it is possible to endow each wavelength-division-multiplexed optical signal with a splitting strength that is as designed and it becomes possible to reduce variations in the amount of dispersion compensation.

Further, if it is so arranged that the optical propagation paths of the other input and output not used as the loop of the 2-input, 2-output optical circuit are made to intersect each other, then it will be unnecessary to bend the input and output propagation paths even if loop length $\Delta L_r$ is shorter than a prescribed length. This means that radiation loss is not increased at bent portions.

Further, the waveguides are made to intersect each other in the vicinity of substantially the center of each Mach-Zehnder interferometer in such a manner that the built-in path-length differences between the two optical waveguides constructing the branches of each MZI portion will be approximately equal. If this is done, one branch of the MZI portion will extend from the inner side to the outer side, the other branch will extend from the outer side to the inner side, the lengths of the two branches can be made uniform and a path-length difference on the order to 0 to $\lambda$ (1.55 $\mu$m) can be achieved.

Further, if two or more of the above-described dispersion compensating filters are connected serially, the dispersion compensation quantity per filter can be reduced to broaden the pass band. As a result, the desired dispersion compensation quantity can be generated overall and the band can be broadened.

Other features and advantages of the present invention will be apparent from the following description taken in conjunction with the accompanying drawings.

DESCRIPTION OF THE PREFERRED EMBODIMENTS

(A) Principles of the Present Invention

Here it will be assumed that a wavelength dispersion compensating filter, which is a 2-input, 2-output optical circuit, is obtained by serially connecting two or more MZIs. As a result, even if the rotation angle of the coupler in the MZI portion deviates from the design value from one device to the next owing to manufacturing variations or the like, dispersion compensation quantity=0 will be obtained by adjusting the value of optical path length difference $\Delta L_{mi} n(\lambda)$ (i=1, 2) between the branches of the MZI using the TO effect. This makes it possible to solve the problem encountered in the prior art. The fact that the above problem is solved will be described taking as an example a case where a 2-input, 2-output circuit (wavelength dispersion compensating filter), which is the simplest arrangement, is constructed by connecting two MZIs in series.

Figure 1:
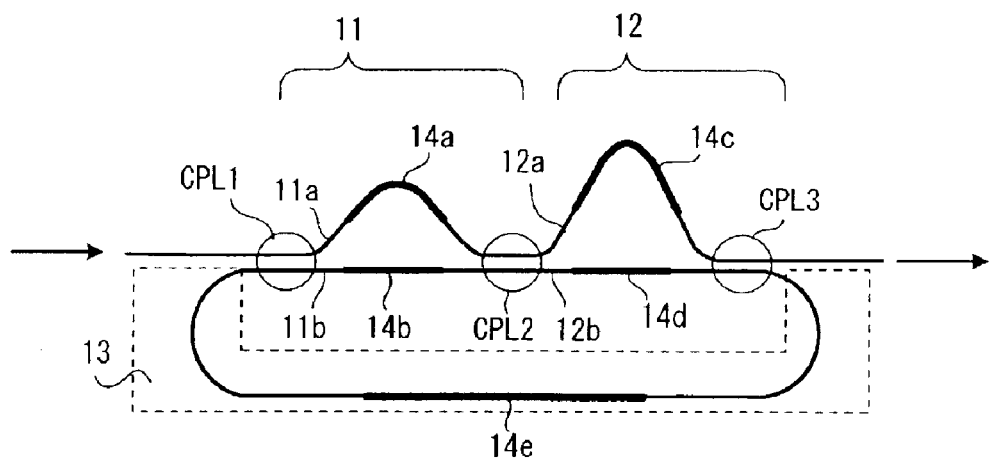
FIG. 1 is a diagram useful in describing the principles of a wavelength dispersion compensating filter of the invention having a 2-input, 2-output optical circuit.

FIG. 1 is a diagram useful in describing the principles of the inventive wavelength dispersion compensating filter having a 2-input, 2-output optical circuit. MZIs 11, 12 each having a structure in which two waveguides 11a, 11b; 12a, 12b are embraced by respective ones of two couplers CPL1, CPL2; CPL2, CPL3 are serially connected to thereby construct a 2-input, 2-output optical circuit. One output and one input of the 2-input, 2-output optical circuit are connected by an optical propagation path to construct a loop circuit 13, and the waveguides 11a, 11b; 12a, 12b of the MZIs 11, 12 as well as the loop circuit 13 are formed to have heaters 14a to 14e, respectively, as path length adjustment portions.

(a) Design Parameters and Driving Method According to the invention (2-stage MZI structure)

The design parameters and operation (see Table 2) of the inventive wavelength dispersion compensating filter having the two MZIs 11, 12 will now be described in brief.

TABLE 2

RELATIONSHIP BETWEEN PARAMETERS OF PRESENT INVENTION (2-MZI STRUCTURE) AND TRANSMISSION CHARACTERISTICS

| DESIGN PARAMETER | RELATED CHARACTERISTICS | DESCRIPTION OF TENDENCY |
|---|---|---|
| ① OPTICAL PATH LENGTH OF LOOP $\Delta L_l n(\lambda)$ | FSR; CENTER FREQUENCY | FSR 0.8 nm SPACING → ABOUT 2-mm SPACING; CONTROL OF CENTER WAVELENGTH WITH LINEAR CHANGE OF $\lambda$ ORDER |
| ② MZI OPTICAL PATH LENGTH DIFFERENCE $\Delta_{m1}(\lambda)$ $\Delta_{m1}(\lambda)$ | DISPERSION COMPENSATION QUANTITY; BANDWIDTH (TRADEOFF) | COMPENSATION QUANTITY IS ADJUSTED BY PERFORMING DRIVE SUCH THAT $\Delta L_{m2} n(\lambda) = -\Delta L_{m1} n(\lambda)$ HOLDS AT $\theta_1 = \theta_3 = \pi/4$ |
| ③ FIRST AND THIRD COUPLER SPLITTING RATIOS $\theta_1, \theta_3$ | STRENGTH OF PHASE CHANGE | VARIATION IN PHASE IS REDUCED IF COUPLING IS WEAK |
| ④ SECOND COUPLER SPLITTING RATIO $\theta_2$ | COMPENSATION QUANTITY ($\theta_1 = \theta_3 = \pi/4$, $\Delta L_{m1} = \Delta L_{m2} = 0$ WHEN MZI HEATER IS NOT DRIVEN) | COMPENSATION QUANTITY WHEN HEATER IS NOT DRIVEN IS INCREASED AS COUPLING IS STRENGTHENED |

① The FSR and control of center wavelength are similar to those of the prior art. The FSR is set by the loop built-in optical path length (loop length prior to adjustment) $\Delta L_l n(\lambda)$, the heater 14e is formed in the loop portion and adjustment of the optical path length on the $\lambda$ order is performed by the TO effect, etc., thereby controlling the center wavelength position within the FSR.

② Path length difference $\Delta L_{mi} n(\lambda)$ (i=1, 2) between the two MZI portions 11 and 12 is related to the amount of dispersion compensation. At rotation angles $\theta_1 = \theta_3 = \pi/4$ of the first and third couplers CPL1, CPL3, drive is performed in such a manner that $\Delta L_{m2} n(\lambda) = -\Delta L_{m1} n(\lambda)$ will hold, thereby controlling the amount of dispersion compensation with the center wavelength being held fixed. It should be noted that the center wavelength shifts when drive is performed asymmetrically. If $\theta_1$, $\theta_3$ have deviated from their design values, the values of $\Delta L_{m1} n(\lambda)$, $\Delta L_{m2} n(\lambda)$ obtained by Equation 25, etc., described below, are applied beforehand as offsets and the differences of the offsets are driven symmetrically.

③ The amount of dispersion compensation at non-heating of the heaters 14a, 14b, 14c, 14d in the MZI portions 11, 12 is substantially decided by the rotation angle (coupling strength) $\theta_2$ of the second coupler CPL2.

④ In a case where $\theta_1 = \theta_3 = \pi/4$ holds, the amount of dispersion compensation increases with an increase in coupling strength starting from a coupling strength of zero and an amount of dispersion compensation of zero. The amount of dispersion compensation attains the maximum value in the vicinity of $\theta_2 = \pi/4$ (the splitting ratio is 1:1).

(b) Transfer Function of Optical Circuit According to the invention (two MZIs serially connected)

The transfer function of the 2-stage MZI structure is expressed by replacing the transfer matrix $m(\lambda)$ of the MZI (4-terminal circuit) in Equation (3) by a transfer matrix $M_2(\lambda)$ (shown below) of the MZI arranged in two stages.

The transfer matrix $M_2(\lambda)$ of the MZI arranged in two stages is expressed as follows using each path length difference $\Delta L_{mi}$ (i=1, 2), coupler rotation (coupling) $\theta_j$ (j=1, 2, 3), effective refractive index $n(\lambda)$ of the waveguide and input wavelength $\lambda$:

$$M_2 = \begin{bmatrix} M_{211} & M_{212} \\ M_{221} & M_{222} \end{bmatrix} \text{ where det } M_2 = 1$$

$$M_2 = \begin{bmatrix} \cos\theta_3 & -\sin\theta_3 \\ \sin\theta_3 & +\cos\theta_3 \end{bmatrix} \begin{bmatrix} \exp[-j\pi\Delta L_{m2}n(\lambda)/\lambda] & 0 \\ 0 & \exp[j\pi\Delta L_{m2}n(\lambda)/\lambda] \end{bmatrix} \times$$

$$\begin{bmatrix} \cos\theta_2 & -\sin\theta_2 \\ \sin\theta_2 & +\cos\theta_2 \end{bmatrix} \begin{bmatrix} \exp[-j\pi\Delta L_{m1}n(\lambda)/\lambda] & 0 \\ 0 & \exp[j\pi\Delta L_{m1}n(\lambda)/\lambda] \end{bmatrix} \begin{bmatrix} \cos\theta_1 & -\sin\theta_1 \\ \sin\theta_1 & +\cos\theta_1 \end{bmatrix}$$

(16)

Here $\Delta Lmi>0$ corresponds to a case where the branch on the through side is long with respect to the input port, and $\Delta Lmi<0$ corresponds to a case where the branch on the cross side is long. The transfer function $H_2(\lambda)$ of the 2-stage MZI structure is expressed as follows using $M_2$ and a phase shift $h(\lambda)$ (path length: $\Delta L_r$) that is produced by the loop-back 13:

$$H_2(\lambda) = \frac{h(\lambda) - M_{222}}{h(\lambda)M_{211} - 1} = \frac{h(\lambda) - M_{211}^*}{h(\lambda)M_{211} - 1} \quad (17)$$

$$h(\lambda) = \exp[-j2\pi\Delta L_r n(\lambda)/\lambda] \quad (18)$$

where $M_211^*$ represents the complex conjugate of $M_211$. From the foregoing, the phase of the transfer function $H_2(\lambda)$ is as follows:

$$\arg H_2(\lambda) = \arctan\left\{\frac{\sin[-2\pi\Delta L_r n(\lambda)/\lambda] - B}{\cos[-2\pi\Delta L_r n(\lambda)/\lambda] - A}\right\} - \arctan\left\{\frac{A\sin[-2\pi\Delta L_r n(\lambda)/\lambda] - B\cos[-2\pi\Delta L_r n(\lambda)/\lambda]}{A\cos[-2\pi\Delta L_r n(\lambda)/\lambda] - B\sin[-2\pi\Delta L_r n(\lambda)/\lambda] - 1}\right\} \quad (19)$$

$A=\cos[\pi(\Delta L_{m1}+\Delta L_{m2})n(\lambda)/\lambda]\cos(\theta_2)\cos(\theta_1+\theta_3)-\cos[\pi(\Delta L_{m1}-\Delta L_{m2})n(\lambda)/\lambda]\sin(\theta_2)\sin(\theta_1+\theta_3)$ (20)

$B=\sin[\pi(\Delta L_{m1}+\Delta L_{m2})n(\lambda)/\lambda]\cos(\theta_2)\cos(\theta_1-\theta_3)-\sin[\pi(\Delta L_{m1}-\Delta L_{m2})n(\lambda)/\lambda]\sin(\theta_2)\sin(\theta_1-\theta_3)$ (21)

(c) Conditions that Give Dispersion Compensation Quantity=0 According to the Invention In order for the amount of dispersion compensation to become zero, it is required that $\arg H_2(\lambda)$ be expressed by the following function:

$$\arg H_2(\lambda) = C_6/\lambda + C_7 \quad (22a)$$

or $$\arg H_2(\lambda) = C_8 \quad (C_6, C_7, C_8 \text{ are constants}) \quad (22b)$$

by the design parameters, in a manner similar to that of the prior-art example. A condition that will satisfy Equations (22a), (22b) is (A,B)=(0,0) or (±1,0), which is similar to the prior-art example.

The solution (A,B)=(0,0) will be described as one example. In the prior-art example, $(\alpha,\beta)$=(0,0) cannot be satisfied only by selecting $\Delta L_m$, a fixed limitation is imposed with regard to the rotation angle $\theta$ of the coupler and this becomes a problem in terms of manufacturability. In order to simplify the discussion set forth below, a description will be rendered in regard to minimum rotation. However, it should be noted that this does not impose any particular limitation upon the parameters of the present invention.

(c-1) Case 1: $\theta_1+\theta_3=\pi/2$

That $\Delta L_{m1}n(\lambda)/\lambda=1/4$, $\Delta L_{m2}n(\lambda)/\lambda=-1/4$ is a solution is readily verified.

(c-2) Case 2: $\theta_1+\theta_3\neq\pi/2$

The following equations are obtained by substituting A=0, B=0 into Equations (20), (21), respectively, and transforming:

$\cos[\pi(\Delta L_{m1}+\Delta L_{m2})n(\lambda)/\lambda]=\cos[\pi(\Delta L_{m1}-\Delta L_{m2})n(\lambda)/\lambda]$
$\tan(\theta_2)\tan(\theta_1+\theta_3)$ (23)

$\sin[\pi(\Delta L_{m1}+\Delta L_{m2})n(\lambda)/\lambda]=-\sin[\pi(\Delta L_{m1}-\Delta L_{m2})n(\lambda)/\lambda]$
$\tan(\theta_2)\tan(\theta_1+\theta_3)$ (24)

In the process of the transformation, use is made of $\cos(\theta_1+\theta_2)\neq 0$ in view of $\theta_1+\theta_3\neq\pi/2$. An equation for selecting the value of $(\Delta L_{m1}-\Delta L_{m2})n(\lambda)$ is obtained as follows using the basic condition $$\cos^2[\pi(\Delta L_{m1}+\Delta L_{m2})n(\lambda)/\lambda]+\sin^2[\pi(\Delta L_{m1}+\Delta L_{m2})n(\lambda)/\lambda]=1$$

of the triangular function and Equations (23) and (24):

$$\cos^2[\pi(\Delta L_{m1}-\Delta L_{m2})n(\lambda)/\lambda] = \frac{1/\tan^2(\theta_2) - \tan^2(\theta_1-\theta_3)}{\tan^2(\theta_1+\theta_3) - \tan^2(\theta_1-\theta_3)} \quad (25)$$

It will be understood that if the values of $\theta_1$, $\theta_2$, $\theta_3$ are given in Equation (25), then the value of $(\Delta L_{m1}-\Delta L_{m2})n(\lambda)$ is obtained. With regard to $(\Delta L_{m1}+\Delta L_{m2})n(\lambda)$, it will suffice to substitute the value of $\cos[\pi(\Delta L_{m1}-\Delta L_{m2})n(\lambda)/\lambda]$, which is obtained from Equation (25), into Equation (23). In order for Equation (25) to be established, it is necessary in view of $\cos^2[\pi(\Delta L_{m1}-\Delta L_{m2})n(\lambda)/\lambda]\leq 1$ to previously decide the values of $\theta_1$, $\theta_2$, $\theta_3$ at the time of design in such a manner that the condition $$1\leq\tan^2(\theta_1+\theta_3)\times\tan^2(\theta_2) \quad (26)$$

will hold even taking into consideration variations in $\theta_1$, $\theta_2$, $\theta_3$ at the time of manufacture. For this condition it will suffice if the design is such that $\theta_1+\theta_3\approx\pi/2$ holds, and therefore this condition is considered to be one that can be satisfied easily.

(c-3) Reconciling both conditions that give dispersion compensation quantity=0 and variations in manufacture according to the invention According to the present invention as described above, by adopting an arrangement in which multiple MZIs are serially connected, dispersion compensation quantity=0 can be achieved by selecting values of $\Delta L_{m1}n(\lambda)$, $\Delta L_{m2}n(\lambda)$ in accordance with values of $\theta_1$, $\theta_2$, $\theta_3$. That is, even if coupler rotation angle deviates from the design value owing to manufacturing variations or the like, dispersion compensation quantity=0 is achieved by adjusting the values of $\Delta L_{m1}n(\lambda)$, $\Delta L_{m2}n(\lambda)$ using the TO effect, etc. This means that the aforementioned problems of the prior-art example can be solved.

Figure 2:
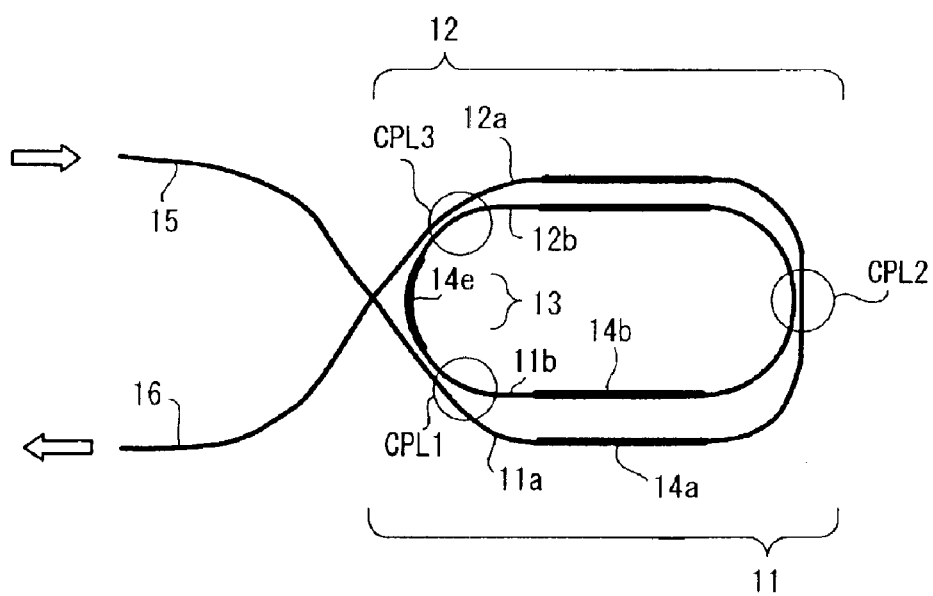
FIG. 2 is a modification of FIG. 1 and is for illustrating the compensation characteristic (group delay characteristic) of the present invention.
Figure 3:
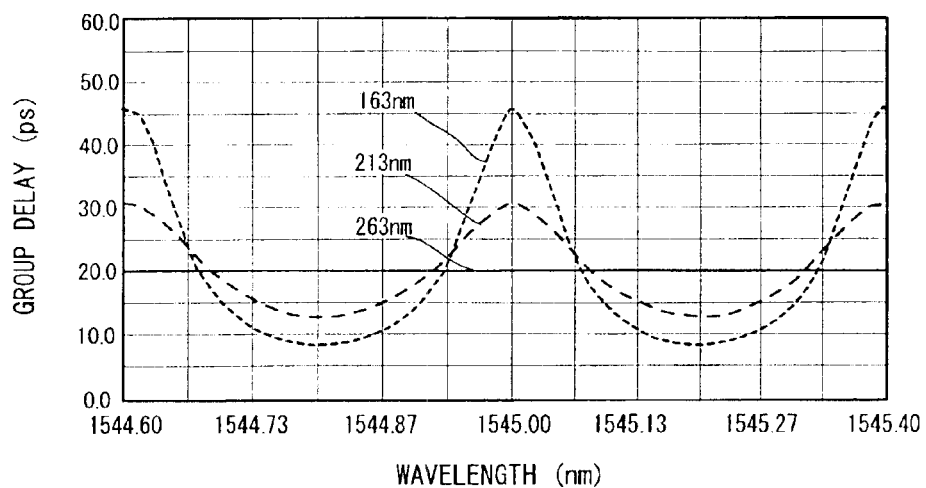
FIG. 3 is a group delay characteristic diagram of a wavelength dispersion compensating filter according to the present invention.

In order afford a comparison with the prior-art example, FIG. 3 illustrates the compensation characteristic (group delay characteristic) of a dispersion compensating filter in FIG. 2, which is a modification of FIG. 1. Components of the dispersion compensating filter of FIG. 2 that are identical with those of FIG. 1 are designated by like reference characters. This modification differs in that loop length $\Delta L_r$ of the loop circuit 13 is reduced and in that input and output waveguides 15 and 16 made to intersect.

FIG. 3 illustrates a compensation characteristic for a case where the rotation angle $\theta_3$ of the third coupler in FIG. 2 has deviated from the design value ($\theta_1=\theta_2=\theta_3=\pi/4$, $L_r=4104$ $\mu$m) by 5%. The numerical value (nm) in FIG. 3 is the path length difference $\Delta L_{m1}n(\lambda)$, $-\Delta L_{m1}n(\lambda)$ between the branches of each MZI. Since the deviation in rotation angle is small in this example, the group delay characteristic of FIG. 3, which is inclusive of dispersion compensation quantity=0 (slope=0), is obtained with almost no shift in the drive of the path length difference $\Delta L_{m1}n(\lambda)$ between the MZI branches of the first stage and of the path length difference $\Delta L_{m2}n(\lambda)$ between the MZI branches of the second stage from symmetrical drive $[\Delta L_{m2}n(\lambda)=-L_{m1}n(\lambda)]$. Further, the center wavelength also is almost unaffected by a deviation in the angle $\theta_3$, and it will be understood that this is sufficiently small.

(B) First Embodiment

Figure 4:
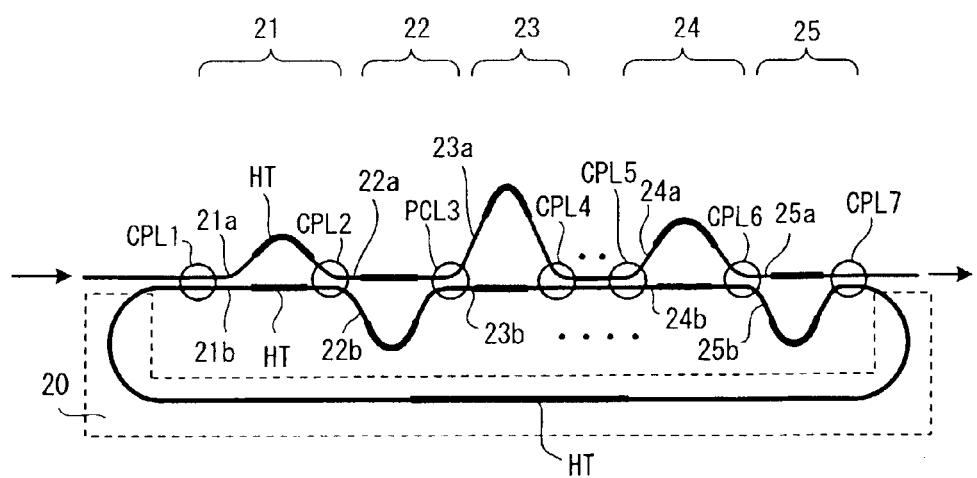
FIG. 4 is a diagram showing the topology of a dispersion compensating filter according to a first embodiment of the present invention.

FIG. 4 is a diagram showing the topology of a dispersion compensating filter according to a first embodiment of the present invention, in which two or more MZIs are serially connected. One output and one input of a 2-input, 2-output optical circuit are connected by an optical propagation path (optical waveguide, optical fiber) to construct a loop circuit 20. The 2-input, 2-output optical circuit is constructed by serially connecting five MZIs 21 to 25. Each MZI has a structure identical with that of the MZI in FIG. 1. The MZIs have two waveguides 21a, 21b to 25a, 25b embraced by two couplers CPLi, CPLj, and heaters HT serving as path length adjustment portions formed on each of the waveguides.

The transfer function of the dispersion compensating filter illustrated in FIG. 4 is expressed by replacing the transfer matrix m($\lambda$) of the MZI (4-terminal circuit) in Equations (1) to (5) by a transfer matrix $M_k(\lambda)$ (shown below) of the MZI arranged in multiple (k) stages.

The transfer matrix $M_k(\lambda)$ of the MZI arranged in multiple ($\lambda$) stages is expressed as follows using each path length difference $\Delta L_{mi}$ (i=1, 2, ... k+1), coupler rotation (coupling) $\theta_i$ (i=1, 2, ... k+1), effective refractive index n($\lambda$) of the waveguide and input wavelength $\lambda$:

$$M_k = \begin{bmatrix} M_{k_{11}} & M_{k_{12}} \\ M_{k_{21}} & M_{k_{22}} \end{bmatrix} \text{ where det } M_k = 1 \qquad (27)$$

$$M_k = \begin{bmatrix} \cos\theta_{k+1} & -\sin\theta_{k+1} \\ \sin\theta_{k+1} & +\cos\theta_{k+1} \end{bmatrix} \begin{bmatrix} \exp[-j\pi\Delta L_{mk}n(\lambda)/\lambda] & 0 \\ 0 & \exp[j\pi\Delta L_{mk}n(\lambda)/\lambda] \end{bmatrix} \times$$

$$\begin{bmatrix} \cos\theta_k & -\sin\theta_k \\ \sin\theta_k & +\cos\theta_k \end{bmatrix}$$

$$\begin{bmatrix} \exp[-j\pi\Delta L_{mk-1}n(\lambda)/\lambda] & 0 \\ 0 & \exp[j\pi\Delta L_{mk-1}n(\lambda)/\lambda] \end{bmatrix} \times \begin{bmatrix} \cos\theta_2 & -\sin\theta_2 \\ \sin\theta_2 & +\cos\theta_2 \end{bmatrix}$$

$$\begin{bmatrix} \exp[-j\pi\Delta L_{m1}n(\lambda)/\lambda] & 0 \\ 0 & \exp[j\pi\Delta L_{m1}n(\lambda)/\lambda] \end{bmatrix} \begin{bmatrix} \cos\theta_1 & -\sin\theta_1 \\ \sin\theta_1 & +\cos\theta_1 \end{bmatrix}$$

Here $\Delta$Lmi>0 corresponds to a case where the branch on the through side is long with respect to the input port, and $\Delta$Lmi<0 corresponds to a case where the branch on the cross side is long. The transfer function Hk($\lambda$) of the arrangement obtained by serially connecting k-number of MZIs is found using the transfer matrix Mk($\lambda$) and the phase shift h($\lambda$) that is produced by the loop-back. The phase argHk($\lambda$) of this transfer function is found. In the first embodiment, positive compensation and negative compensation, inclusive of dispersion compensation quantity=0, can be achieved using k-number of path length differences $\Delta$Lmi (i=1, 2, ... k) even if $\theta_1$ to $\theta_3$ exhibit variations owing to manufacture.

Adjustment of optical path length

Figure 5:
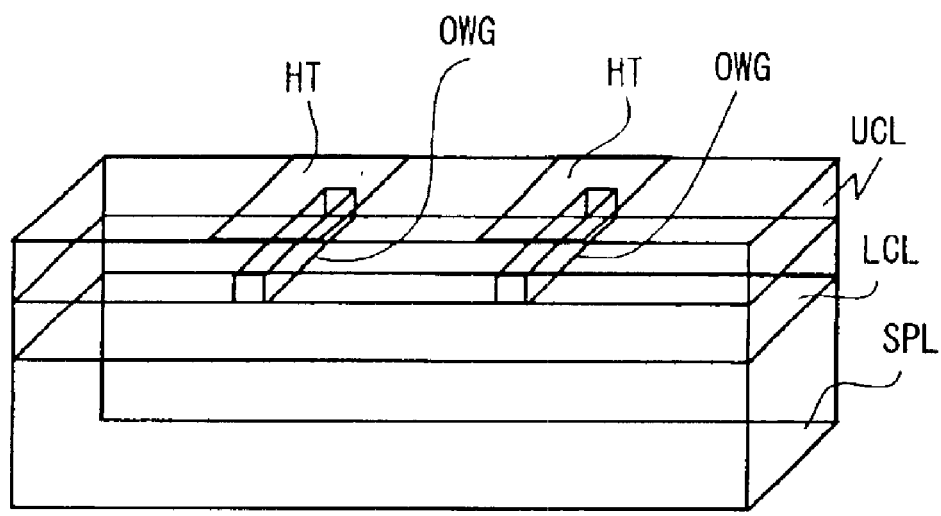
FIG. 5 illustrates an example of the structure of means for adjusting optical path-length difference in an $SiO_2$-type waveguide.

Methods of varying the path length difference $\Delta$Lmi of the MZI portions 21 to 25 and the path length $\Delta L_r$ of the loop circuit 20 are 1̂ a method regarding the SiO$_2$-type waveguide, and 2̂ a method regarding an LiNbO$_3$-type waveguide. As shown in FIG. 5, the method of varying optical path length in an SiO$_2$-type waveguide includes building up an upper clad UCL on the top side of waveguide core OWGs formed on a lower clad LCL of a silicon substrate SPL, forming a heater HT on the upper clad UCL and controlling the optical path length by varying the refractive index of the waveguides OWG through heating of the heaters. (This method relies upon the TO effect.)

Figure 6:
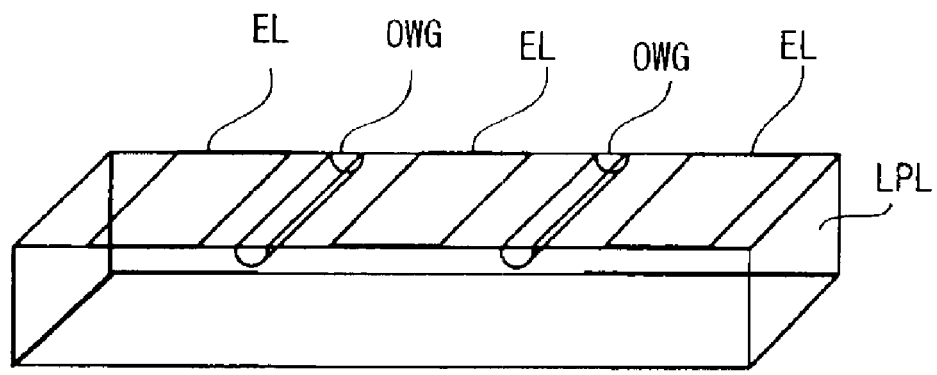
FIG. 6 illustrates an example of the structure of means for adjusting optical path-length difference in an $LiNbO_3$-type waveguide.

As shown in FIG. 6, the method of varying optical path length in an LiNbO$_3$-type waveguide includes forming electrodes EL in parallel on waveguides OWG formed by diffusing Ti in an LiNbO$_3$ substrate LPL, applying an electric field to the waveguide portions and controlling the optical path length by varying the dielectric constant, namely the refractive index. (This method relies upon the EO effect.)

The first embodiment shown in FIG. 4 is an example of an SiO$_2$ waveguide, and means for adjusting path length difference is constructed by the heaters HT. With regard to an LiNbO$_3$ waveguide, the means for adjusting path length difference can be constructed by adopting the arrangement shown in FIG. 6.

Coupler

Figure 7:
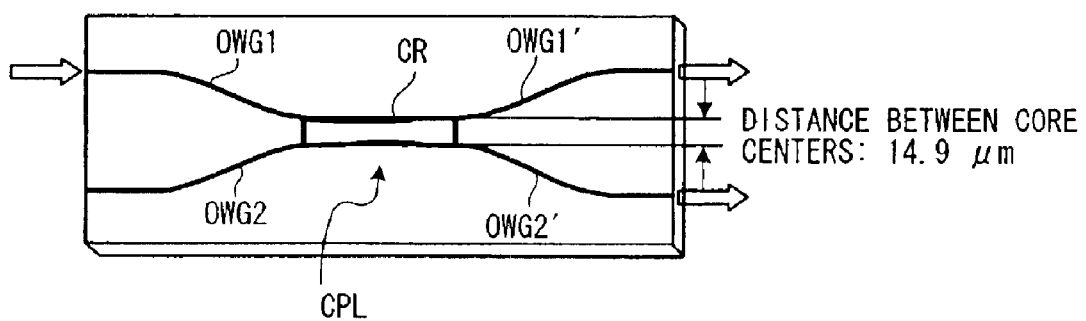
FIG. 7 illustrates an example of the structure of an MMI-type coupler.

The coupler CPL in the dispersion compensating filter can be constructed by either of two methods. A coupler based upon the first method of construction is an MMI (Multi-Mode Interferometer) coupler obtained by coupling two waveguides OWG1, OWG2 by a single core layer CR, as shown in FIG. 7. FIG. 7 illustrates an example of the structure of an MMI-type coupler. This is an example in which the distance between core centers of the core waveguides OWG1, OWG2 is 14.9 $\mu$m, splitting is 50% and the core-clad difference in refractive indices is 0.8%.

Figure 8:
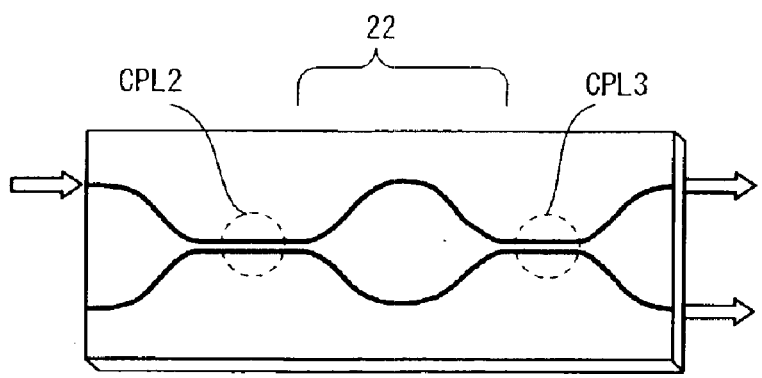
FIG. 8 illustrates an example of the structure of a WINC-type coupler.

A coupler based upon the second method of construction is one having little wavelength dependence, such as a WINC (see Wavelength-Independent Coupler: K. Jinguji et al., Journal of Lightwave Technology, vol. 14, No. 10 1996, p. 2301), in which the parameters are coupling length L of MZI 22 and path length difference ΔLm between the branches, as shown in FIG. 8. FIG. 8 illustrates an example of the structure of a WINC-type coupler. Here the path length difference of the MZI 22 is 1900 μm, coupling length of unidirectional coupler CPL2 on the left side is 1900 μm, distance between the core centers is 9.2 μm, coupling length of unidirectional coupler CPL3 on the right side is 795 μm distance between the core centers is 9.2 μm, splitting is 50% and the core-clad difference in refractive indices is 0.8%.

Figure 9:
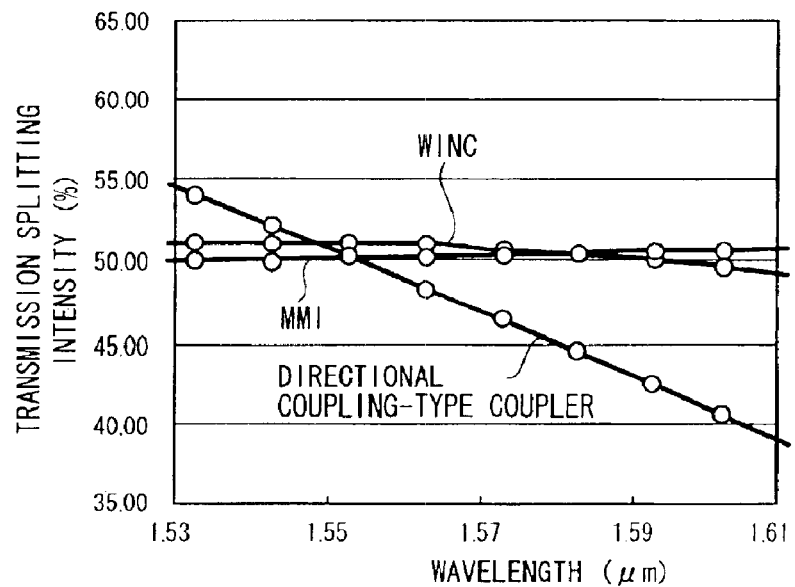
FIG. 9 is a wavelength vs. transmission splitting intensity characteristic diagram illustrating the wavelength dependence of the splitting intensities of an MMI-type coupler, WINC-type coupler and directional coupling-type coupler.

FIG. 9 is a wavelength vs. transmission splitting intensity characteristic diagram (simulation) illustrating the wavelength dependence of the splitting intensities of an MMI-type coupler, WINC-type coupler and directional coupling-type coupler. As evident from the characteristic diagram, the splitting intensities of the MMI-type coupler and WINC-type coupler are a substantially constant 50% and are independent of wavelength. It is possible to endow each wavelength-division-multiplexed optical signal with a splitting strength that is as designed and it becomes possible to reduce variations in the amount of dispersion compensation from wavelength to wavelength.

(C) Second Embodiment

Figure 10:
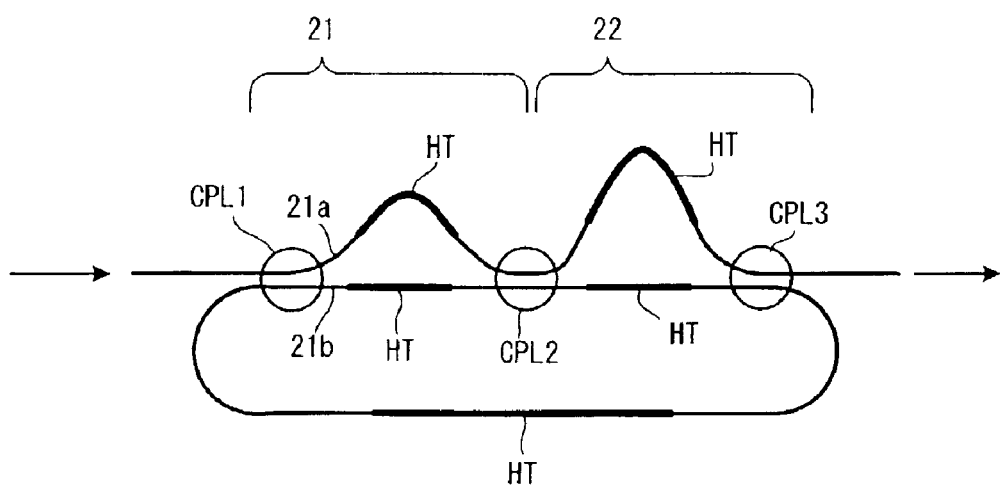
FIG. 10 is a diagram showing the topology of a dispersion compensating filter according to a second embodiment of the present invention.

FIG. 10 is a diagram showing the topology of a dispersion compensating filter according to a second embodiment of the present invention. This illustrates an example in which the number of MZIs connected in the first embodiment is made two. Components identical with those of the first embodiment in FIG. 4 are designated by like reference characters. The second embodiment is the minimal structure of the present invention for controlling the amount of dispersion compensation. This is a two-stage arrangement in which the number of MZI stages is two. According to the second embodiment, positive compensation and negative compensation, inclusive of dispersion compensation quantity=0, can be achieved even if manufacturing variations occur, as described above in accordance with FIG. 1. In other words, if the maximum value of positive compensation is +a and the maximum value of negative compensation is –b, then any desired amount of compensation can be achieved over the range –b to +a.

(D) Third Embodiment

Figure 11:
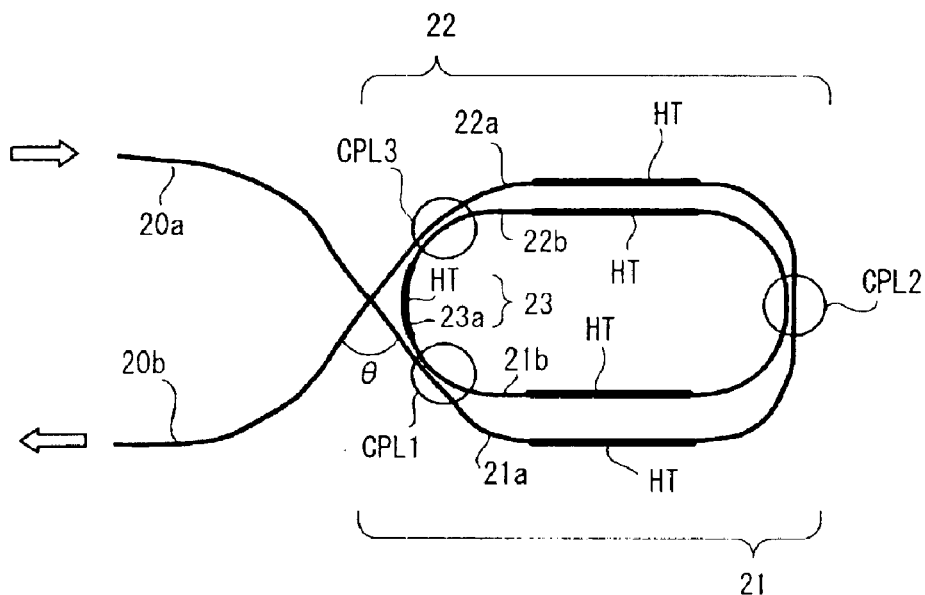
FIG. 11 is a diagram showing the topology of a dispersion compensating filter according to a third embodiment of the present invention.

FIG. 11 is a diagram showing the topology of a dispersion compensating filter according to a third embodiment of the present invention. This is a two-stage arrangement in which the number of MZI stages is two. Here input and output optical propagation paths 20a, 20b not used as the loop of the 2-input, 2-output optical circuit are made to intersect at an angle of 10· or greater. Two waveguides 21a, 21b; 22a, 22b of the MZIs 21, 22 are embraced by two couplers CPL1, CPL2; CPL2, CPL3. This constructs a 2-input, 2-output optical circuit in which two MZIs are serially connected.

One output and one input of the 2-input, 2-output optical circuit are connected by an optical propagation path 23a to construct a loop circuit 23, and the waveguides 21a, 21b; 22a, 22b of the MZIs 21, 22 as well as the loop circuit 23 are formed to have heaters HT as path length adjustment portions. The dispersion compensating filter of the third embodiment is a two-stage arrangement in which the number of MZIs is two and is similar to the second embodiment of FIG. 10 except for the fact that optical propagation paths 20a, 20b are made to intersect at an angle of 10· or greater and the fact that the loop length $\Delta L_r n(\lambda)$ of the loop circuit 23 is small.

This arrangement is a layout in a case where a loop length $\Delta L_r$ of sufficient size cannot be assured owing to the design value of the FSR. In other words, the loop length $\Delta L_r$ of the loop circuit diminishes when the FSR is small. If the loop length $\Delta L_r$ becomes too small, the input and output propagation paths 20a, 20b must be bent. In the actual manufacturing process, minimum bending radius $r_m$ is limited owing to radiation loss at the bent portions. If the loop length $\Delta L_r$ is less than a prescribed length, then the bending radius at the bends of the propagation paths 20a, 20b falls below the minimum bending radius $r_m$ and radiation loss increases. Even if the loop length $\Delta L_r$ diminishes, however, bending becomes unnecessary and, hence, there is no increase in radiation loss if the arrangement in which the propagation paths 20a, 20b are made to intersect is adopted, as in the present invention. It should be noted that the angle of intersection between the optical propagation paths 20a, 20b is required to be 10· or greater in order to eliminate leakage from other path due to the intersection.

(E) Fourth Embodiment

Figure 12:
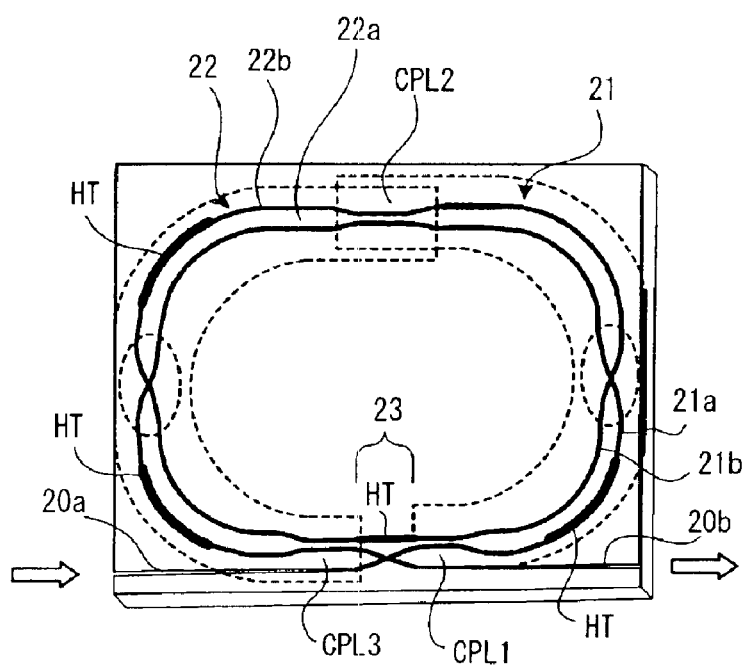
FIG. 12 is a diagram showing the topology of a dispersion compensating filter according to a fourth embodiment.

FIG. 12 is a diagram showing the topology of a dispersion compensating filter according to a fourth embodiment of the present invention. Components identical with those of the third embodiment in FIG. 11 are designated by like reference characters. As in the third embodiment, this dispersion compensating filter is a two-stage arrangement in which the number of MZIs is two. Moreover, input and output optical propagation paths 20a, 20b not used as the loop of the 2-input, 2-output optical circuit are made to intersect. In addition, in order that the built-in optical-path length differences of the two waveguides 21a, 21b; 22a, 22b of each of the MZI portions 21, 22 will become substantially equal, the waveguides are made to intersect each other in the vicinity of substantially the center of each MZI. Further, one output and one input of the 2-input, 2-output optical circuit are connected by an optical propagation path to construct the loop circuit 23, and the waveguides 2a, 21b; 22a, 22b of the MZIs 21, 22 as well as the loop circuit 23 are formed to have heaters HT as path length adjustment portions.

The optical-path length difference actually necessary for the MZI portions 21, 22 is on the order of 0 to λ (1.55 μm) when one considers that adjustment is performed within the minimum phase range. On the other hand, the difference in the lengths on the layout between the inner and outer sides of the MZI branch constructing the bent portion is not on the order of λ (1.55 μm) when one considers a distance that will not result in optical interference and a distance that will not produce thermal interference in order to achieve control using the TO effect. For example, a difference for avoiding optical interference differs depending upon the difference in refractive index between that of the core and that of the clad but is on the order of tens of microns at a difference in refractive index of 0.5%. A distance that will not produce thermal interference is 100 μm or greater if an $SiO_2$ waveguide is formed on a silicon substrate and the clad portion does not have heat insulating structure. Therefore, in a case where the difference in the radii of the branches (waveguides) 21a, 21b; 22a, 22b between the inner and outer sides is, e.g., 250 μm, then the difference between the distances produced up to the second coupler, which is substantially the position of a semicircle, will be 785 μm, and the difference between the lengths will become much larger than λ (1.55 μm).

Accordingly, though a layout in which the branch on the inner side is slackened further toward the center is conceivable, the bending radius in a case where the branch is slackened is limited by the minimum bending radius and chip size increases as a consequence. Accordingly, as illustrated in the fourth embodiment of FIG. 12, in order that the built-in optical-path length differences of the two waveguides 21a, 21b; 22a, 22b constituting the branches of each of the MZI portions 21, 22 will become substantially equal, the waveguides are made to intersect each other in the vicinity of substantially the center of each MZI. As a result, one branch of the MZIs extends from the inner side to the outer side, and the other extends from the outer side to the inner side so that the lengths of the two branches can be made uniform. This makes it possible to achieve an optical-path length difference on the order of 0 to λ (1.55 μm).

(F) Fifth Embodiment

Figure 13:
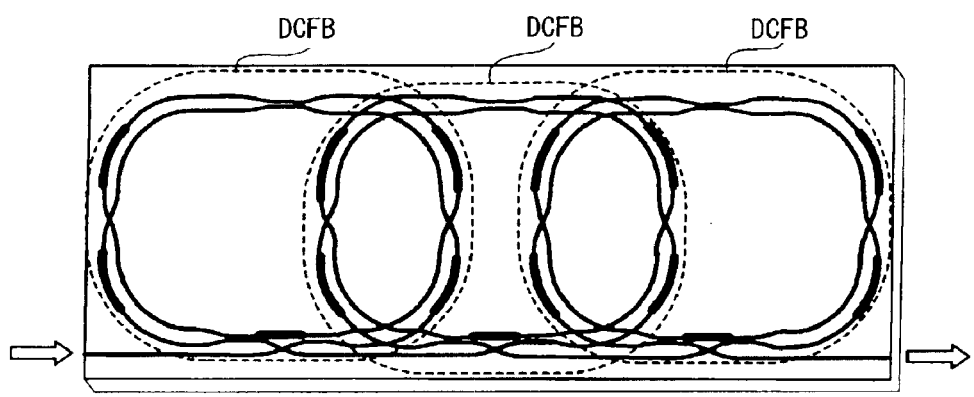
FIG. 13 is a diagram showing the topology of a dispersion compensating filter according to a fifth embodiment.

FIG. 13 is a diagram showing the topology of a dispersion compensating filter according to a fifth embodiment. This is an arrangement in which three dispersion compensating filters DCFB according to the fourth embodiment are serially connected.

Figure 14:
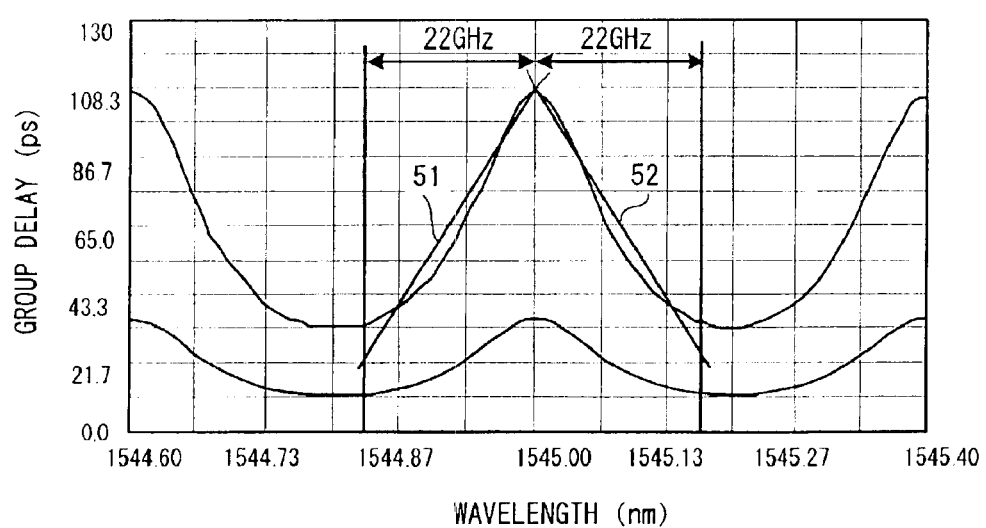
FIG. 14 illustrates a dispersion compensation characteristic in the case of the 3-stage arrangement of FIG. 13.

In general, there is a trade-off between the amount of dispersion compensation and the pass band. In case of optical pulses having a high bit rate, the sideband thereof is broad and a wider bandwidth is required. In the fifth embodiment, therefore, the amount of dispersion compensation per stage is set to be small and it is so arranged that the desired amount of dispersion compensation and desired band are obtained overall. FIG. 14 illustrates a dispersion compensation characteristic in the case of the 3-stage arrangement of FIG. 13. Here it is possible to perform dispersion compensation on the order of ±510 nm/ps with regard to the 22-GHz band necessary for a 10-Gbps transmission. It should be noted that the deviation from the straight lines 51, 52 in FIG. 14 is regarded as group delay ripple and is not large enough to cause problems at 10 Gbps.

(G) Sixth Embodiment

Figure 15:
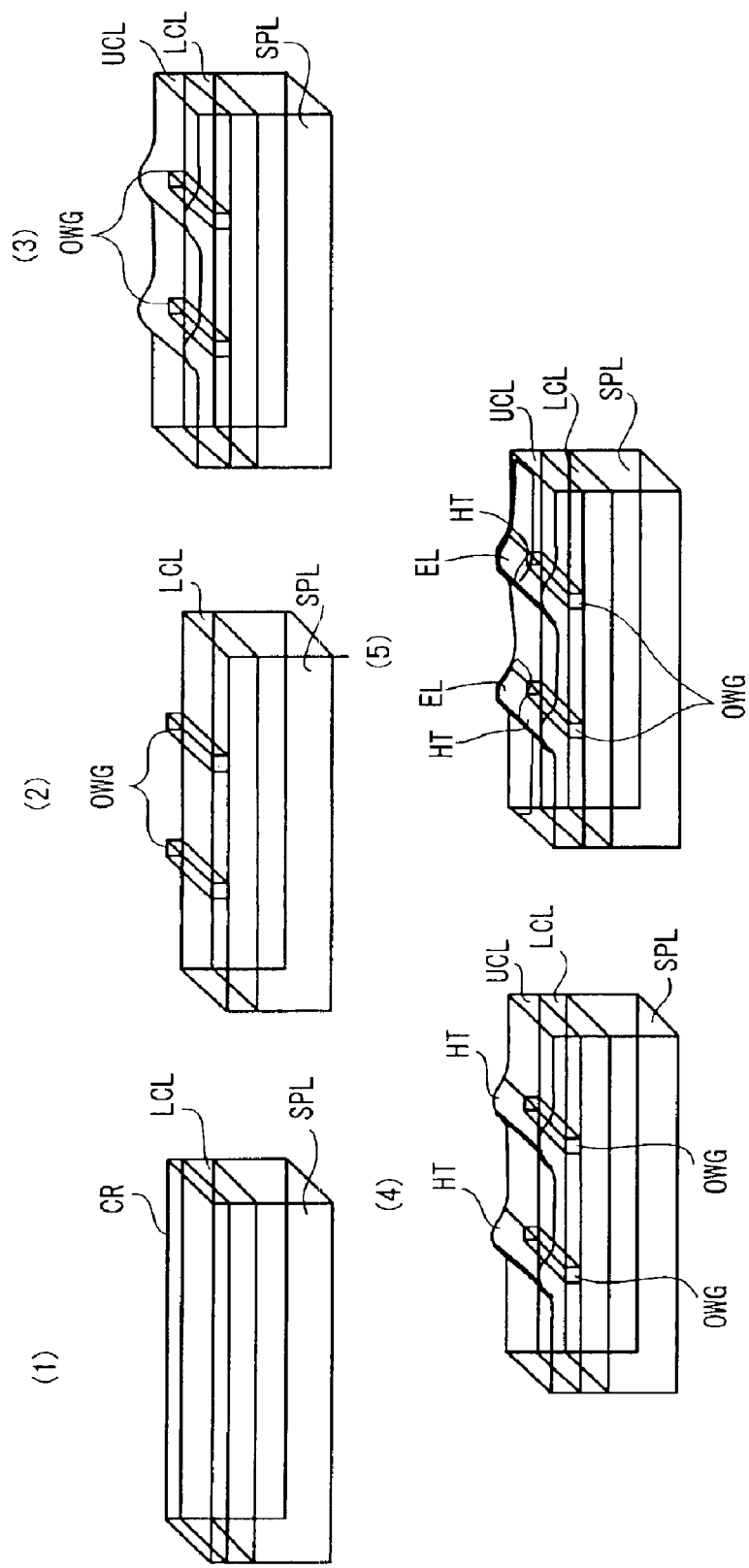
FIG. 15 illustrates an example of the steps of a manufacturing process for achieving the structure of a dispersion compensator according to the present invention.
Figure 16:
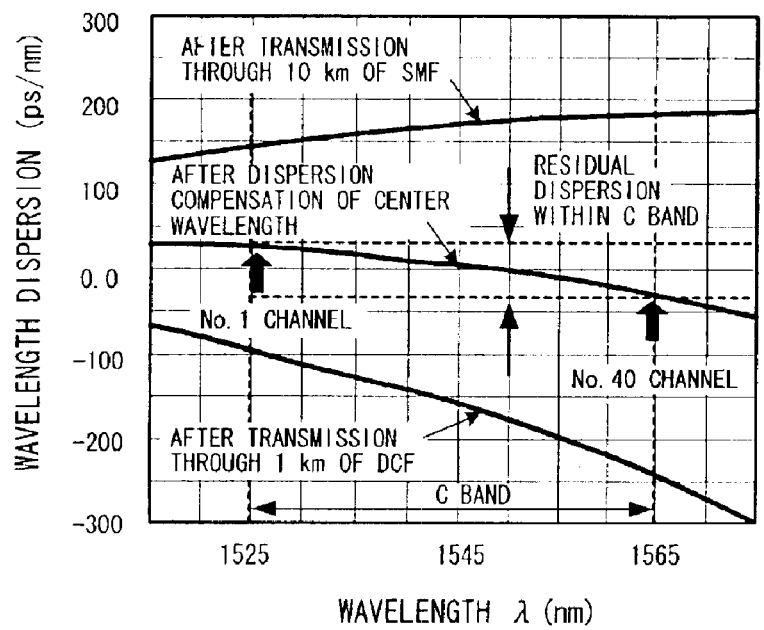
FIG. 16 is a diagram useful in describing residual dispersion.
Figure 17:
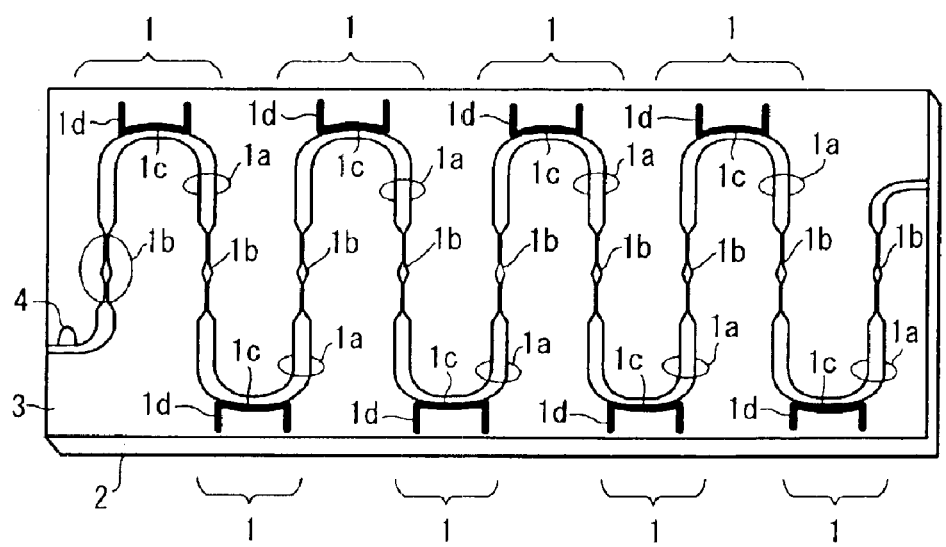
FIG. 17 is a diagram showing a prior-art dispersion compensating filter composed of serially connected multiple MZIs.
Figure 18:
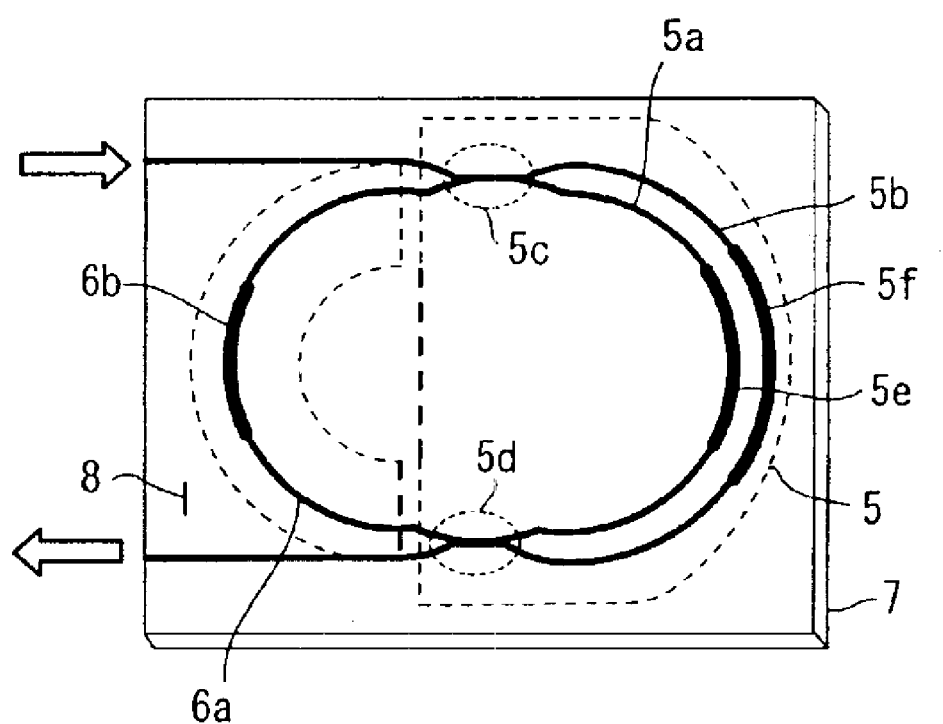
FIG. 18 is a Madsen-type prior-art dispersion compensating filter.
Figure 19:
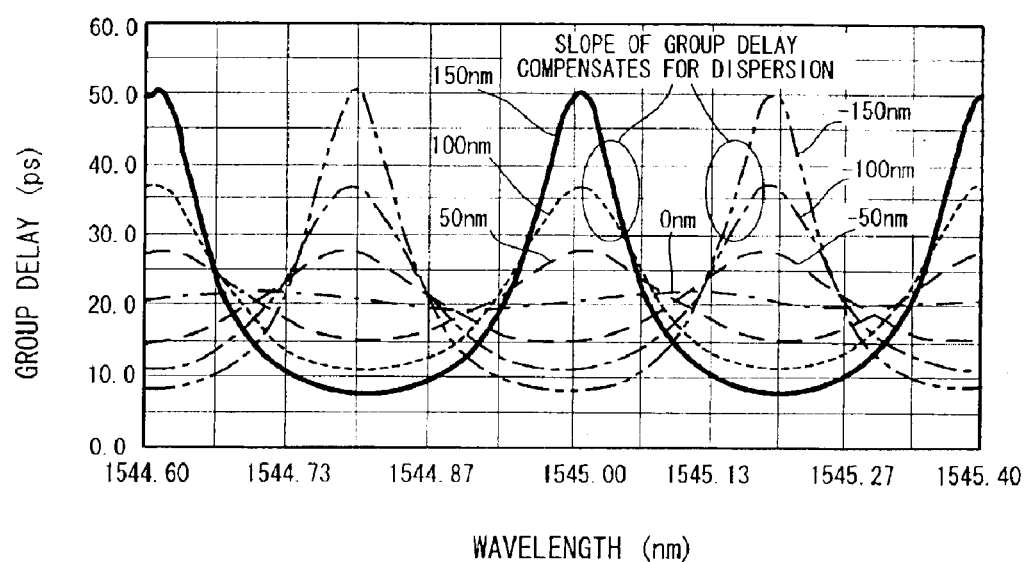
FIG. 19 shows a group delay characteristic according to an example of the prior art.

FIG. 15 illustrates an example of the steps of a manufacturing process for achieving the structure of a dispersion compensator according to the first to fifth embodiments of present invention.

When a dispersion compensating filter is created, first an $SiO_2$ film is formed as the lower clad layer LCL on the silicon substrate SPL by the CVD (Chemical Vapor Deposition) or FHD (Flame Hydrolysis Deposition) method. At this time P (phosphorous), B (boron) or Ge, etc. (germanium) may be added to control film stress and refractive index. Next, the core layer CR through which light is guided is formed in the same manner as the clad layer by the CVD or FHD method [step (1)]. At this time the refractive index is made higher than that of the clad layer LCL by increasing the density of germanium or by adding Ti (titanium).

This is followed by forming a mask conforming to a core pattern on the core layer and transferring the core pattern (waveguide) OWG by dry etching [step (2)]. Available as the mask are an organic material mask exhibiting photosensitivity or a metal mask obtained by vapor-depositing a metal such as Cr (chrome) and then etching this metal film using the organic material as a mask.

The mask is then removed chemically and core embedding is carried out by forming the upper clad layer UCL in a manner similar to that of the lower clad layer LCL using the CVD method or FHD method [step (3)]. After core embedding is performed, the thin-film heaters HT necessary for adjusting optical path length and the upper electrodes EL are formed as by the lift-off method [steps (4), (5)]. Specifically, a photosensitive organic material is patterned in such a manner that only portions on which the heaters HT, etc., are formed will not be masked, a heater material and electrode material are vapor-deposited from above the mask, then the mask of organic material is removed as by an organic solvent. The heater material used may be Pt (platinum), W (tungsten), nichrome or Cr, and the organic material used may be Au (gold), Cu (copper) or Al (aluminum), etc. A metal such as titanium having a high melting point should be vapor-deposited thinly in order to improve the adherence between these metals and $SiO_2$.

Thus, in accordance with the present invention as described above, even if the rotation angle of a coupler in an MZI portion-deviates from the design value from one device to the next owing to manufacturing variations or the like, dispersion compensation quantity=0 will be obtained by adjusting the value of optical path length difference $\Delta L_{min}$ (λ) between the branches of the MZI using the TO effect, etc. As a result, device manufacturability (yield) can be increased by a wide margin and the cost of the dispersion compensating device can be reduced. Such a low-cost wavelength dispersion compensating device whose amount of compensation can be varied contributes to cost reduction in a DWDM transmission system and to simplification of design.

Further, in accordance with the present invention, the size of the dispersion compensating filter can be reduced by serially connecting two MZIs.

Further, in accordance with the present invention, a coupler having little wavelength dependence is used as the couplers that construct the MZIs. As a result, it is possible to endow each wavelength-division-multiplexed optical signal with a splitting strength that is as designed and it becomes possible to reduce variations in the amount of dispersion compensation. This makes it possible to reduce variations in amount of dispersion compensation from wavelength to wavelength.

Further, in accordance with the present invention, it is so arranged that the optical propagation paths of an input and output not used as a loop in a 2-input, 2-output optical circuit intersect each other, then it will be unnecessary to bend the input and output propagation paths even if loop length $\Delta L_r$ is shorter than a prescribed length.

Further, in accordance with the present invention, it is so arranged that the waveguides are made to intersect each other in the vicinity of substantially the center of each MZI. As a result, one branch of the MZI extends from the inner side to the outer side, and the other extends from the outer side to the inner side so that the lengths of the two branches can be made uniform. This makes it possible to achieve an optical-path length difference on the order of 0 to λ (1.55 μm).

Further, in accordance with the present invention, it is so arranged that two or more of the above-described dispersion compensating filters are connected serially. This makes it possible to reduce the dispersion compensation quantity per filter and broaden the pass band. As a result, the desired dispersion compensation quantity can be generated overall and the band can be broadened.

As many apparently widely different embodiments of the present invention can be made without departing from the spirit and scope thereof, it is to be understood that the invention is not limited to the specific embodiments thereof except as defined in the appended claims.

What is claimed is:

1. A wavelength dispersion compensating filter having a 2-input, 2-output optical circuit;

said 2-input, 2-output optical circuit being constructed by serially connecting a plurality of Mach-Zehnder interferometers possessing a structure in which two waveguides are embraced by two couplers;

one output and one input of said two 2-input, 2-output optical circuit being connected by an optical propagation path to thereby construct a loop circuit; and the waveguides of the Mach-Zehnder interferometers as well as the loop circuit each being provided with an optical path-length adjustment portion.

2. The filter according to claim 1, wherein said optical path-length adjustment portion has means for adjusting optical path length by an electro-optic effect.

3. The filter according to claim 1, wherein said optical path-length adjustment portion has means for adjusting optical path length by a thermo-optic effect.

4. A wavelength dispersion compensating filter comprising two Mach-Zehnder interferometers serially connected.

5. The filter according to claim 1, wherein a coupler having comparatively little wavelength dependence is used as the couplers that construct the Mach-Zehnder interferometers.

6. The filter according to claim 1, wherein the optical propagation paths of the other input and output not used as the loop of said 2-input, 2-output optical circuit are made to intersect each other.

7. The filter according to claim 1, wherein the waveguides are made to intersect each other in the vicinity of substantially the center of each Mach-Zehnder interferometer in such a manner that built-in path length differences between the two optical waveguides constructing the branches of each MZI portion will be approximately equal.

8. The filter according to claim 1, wherein two or more of said dispersion compensating filters are serially connected.

9. The filter according to claim 1, wherein the dispersion compensating filters are created using a process for forming an optical waveguide layer of $SiO_2$ on a silicon substrate.

10. The filter according to claim 4, wherein a couple having comparatively little wavelength dependence is used as the couplers that construct the Mach-Zehnder interferometers.

11. The filter according to claim 4, wherein the optical propagation paths of the other input and output not used as the loop of said 2-input, 2-output optical circuit are made to intersect each other.

12. The filter according to claim 4, wherein the way guides are made to intersect each other in the vicinity of substantially the center of each Mach-Zehnder interferometer in such a manner that built-in path length differences between the two optical waveguides constructing the branches of each MZI portion will be approximately equal.

13. The filter according to claim 4, wherein two or more of said dispersion compensating filters are serially connected.

14. The filter according to claim 4, wherein the dispersion compensating filters are created using a process for forming an optical waveguide layer of $SiO_2$ on a silicon substrate.

* * * * *